Patented May 15, 1934

1,958,715

UNITED STATES PATENT OFFICE 1,958,715

PROTECTIVE OVERCOATING

Earle E. Richardson, Rochester, N. Y., assignor to Eastman Kodak Company, Rochester, N. Y., a corporation of New York No Drawing. Application May 29, 1930, Serial No. 457,510

8 Claims. (Cl. 91—68)

This invention relates to a new type of protective coating, and particularly to such coatings as are used for the final or over coating for the protection of undercoatings from the short rays of light.

The cellulose nitrate lacquer industries have increased tremendously in the past few years, due primarily to the ease with which this lacquer may be coated upon metallic or other surfaces, and likewise to the rapidity with which this lacquer dries. In the automotive industry particularly its use has released considerable of the materials which formerly were held in process and has, therefore, decreased greatly the expense incident to their coating and finishing. From the consumer's standpoint, however, cellulose nitrate lacquers have not appreciably increased the period of time during which his automobile or other lacquer finished products are kept from corrosion and in which they retain their initial glossy and new appearance; it being a well known fact that cellulose nitrate loses its gloss with relatively great rapidity when exposed to the elements. While the delustering and decomposition of the cellulose nitrate surfaces is to some extent due to the inclement weather conditions, it nevertheless is primarily due to the ultra-violet rays from the sun which penetrate and decompose the surface layer.

While the addition of pigments, gums, and plasticizers to the cellulose nitrate composition aids to a slight extent in rendering the cellulose nitrate layer less affected by the ultra-violet light, the protection they afford is not by any means complete. With even a considerable amount of these constituents in the lacquer there is, nevertheless, upon the surface a goodly proportion of the cellulose nitrate exposed to the solar radiations. Moreover, it has been found that the exposed cellulose nitrate under such conditions will be decomposed by the ultra-violet light incident to its surface. Furthermore, decomposition of the exposed cellulose nitrate will auto-catalyze the underlying cellulose nitrate particles which are in immediate contact with them. This auto-catalysis of the cellulose nitrate creeps through the whole surface with ever increasing velocity with a resultant decomposition which gives chalking and loss of luster. To obviate this difficulty it has been suggested that a high gloss varnish or other transparent material be overcoated on the nitrate or other coating to inhibit its breakdown. While it has been previously suggested to overcoat nitrate lacquers with clear lacquer containing cellulose acetate, see the copending application of P. C. Seel Serial No. 425,353, I find that the protective effect of such acetate lacquer coatings may be materially improved, particularly from the standpoint of light protection, by preparing them in accordance with my invention.

An object of the present invention is, therefore, to provide a filter for the absorption of the short light rays. Another object is to provide an overcoating which absorbs substantially all the ultra-violet light which has a deleterious effect upon the undercoating. A further object of this invention is to provide a cellulose acetate overcoating which contains materials which render this overcoat opaque to the ultra-violet whereby these undercoatings are protected from deterioration. Other objects will hereinafter appear.

I have found that if such materials as nitrobenzol, nitro-anisol and quinaldine are added in certain amounts to a cellulose derivative, such as cellulose acetate, or other suitable vehicle, the resulting compound will act as a filter for ultra-violet light. The practical and theoretical explanation of the action of ultra-violet light filters is explained fully in my joint copending application with C. J. Staud Serial No. 410,708 and need not be amplified here.

I have found that if lacquer or similar compositions containing the above ingredients be used as an overcoating for cellulose nitrate or other surfaces which are affected by the ultra-violet light, the overcoating containing my filter will protect the undercoatings from degradation due to these light rays. The amounts of these ingredients required vary somewhat with the type of vehicle used, but generally amounts up to 3 per cent will give the maximum filtering action for these particular filters.

In some instances, however, as much as 10% will be required to reach this maximum. Upon addition to the vehicle, such as cellulose acetate, of the amount of the filter to give the substantial maximum opacity, a greater addition of the filter does not appreciably increase the opaqueness of the film to the ultra-violet rays. If the chemical employed as a filter, therefore, happens to be also a good plasticizer for the cellulose acetate, it may be used in plasticizing amounts, i. e., 10%, 20% to 50% and sometimes slightly above 50% by weight of the vehicle. By the use of such a combination filter and plasticizer it is not necessary, of course, to add an additional plasticizer to the composition. However, when an ingredient is used which, when added to the cellulose acetate or other plasticizable composition in amounts greater than that necessary to render the film opaque to the ultra-violet, imparts to the film some color, which is objectionable, it is often desirable to use only sufficient of such a filter to give the maximum opacity to the ultra-violet rays and at the same time add to the composition a separate plasticizer which may have no filtering activity whatsoever. Numerous plasticizers for the various cellulose derivatives are well known such as triphenylphosphate, tricresylphosphate and the chlorinated naphthalenes, all of which may be suitable for particular purposes.

While the vehicle which I have found having in itself excellent resistance to the ultra-violet and, therefore, very suitable as a vehicle for holding the filter, is cellulose acetate, it is only one of a number of organic esters of cellulose which may be employed. In selecting these esters of cellulose it is advantageous that they be not disintegrated or appreciably degraded themselves by the ultra-violet light, for if esters which are so affected were used as an overcoating they would, of course, disintegrate as rapidly as a nitrocellulose coating and no increased life or continued new appearance of the surface would result. As has been stated hereinbefore, cellulose nitrate as an overcoating is not particularly advantageous due to the fact that it disintegrates rapidly when subjected to these light rays. Other vehicles than cellulose organic esters may, however, be employed for this purpose of overcoating, the only requisites which are necessary are that they be not degraded by the ultra-violet light and be compatible with the filter chemicals which are added to render them opaque to the ultra-violet. Varnishes and gums may therefore be substituted for the cellulose organic esters or, for that matter, other types of cellulose derivatives as the cellulose mixed esters such as cellulose acetolactate, cellulose aceto-pyruvate, and the various mixed organic esters of cellulose, as described in the copending application of Webber and Staud, Serial Numbers 383,147-8-9. Some of the mixed inorganic esters of cellulose are likewise applicable such, for example, as the cellulose nitroacetates, or the higher organic esters of cellulose may be employed, such as cellulose propionate, cellulose butyrate, etc.

From a consideration of the above disclosure it will be realized that any vehicle containing the hereinabove disclosed organic ultra-violet filters will come within the scope of this invention, and particularly those vehicles composed of organic esters of cellulose containing these filters, as well as the employment of these coatings as overcoatings for the protection of undercoatings which are deleteriously effected by the ultra-violet light.

What I claim as my invention and desire to be secured by Letters Patent of the United States is:

1. An article of manufacture having a cellulose nitrate undercoating and an overcoating of a cellulose acetate composition containing from ¼% to 10% of a nitrogen containing organic compound selected from the group consisting of nitro-anisol, nitro-benzol, and quinaldine.

2. An article of manufacture having a cellulose nitrate undercoating and an overcoating of a cellulose acetate composition containing from ¼% to 10% of a nitrogen containing organic compound selected from the group consisting of nitro-anisol, nitro-benzol, and quinaldine, and a plasticizer.

3. An article of manufacture having a cellulose nitrate undercoating and an overcoating of a cellulose acetate composition containing from ¼% to 10% of a nitrogen containing organic compound selected from the group consisting of nitro-anisol, nitro-benzol, and quinaldine, and triphenylphosphate.

4. An article of manufacture having a cellulose nitrate undercoating and an overcoating of a cellulose acetate composition containing from ¼% to 10% of quinaldine.

5. An article of manufacture having a cellulose nitrate undercoating and an overcoating of a cellulose acetate composition containing from ¼% to 10% of nitro-anisol.

6. An article of manufacture having a cellulose nitrate undercoating and an overcoating of a cellulose acetate composition containing from ¼% to 10% of nitro-benzol.

7. An article of manufacture having a cellulose nitrate undercoating and an overcoating comprising an organic ester of cellulose and from ¼% to 10% of a nitrogen-containing organic compound selected from the group consisting of nitro anisol, nitro benzol, and quinaldine, said overcoating having the characteristic that it is absorbent of substantially all the rays of the spectrum of those wave lengths of the ultra-violet light that penetrates the earth's atmosphere.

8. An article of manufacture having a cellulose nitrate undercoating and an overcoating comprising cellulose acetate and from ¼% to 10% based on the weight of the cellulose acetate, of a nitrogen-containing organic compound selected from the group consisting of nitro-anisol, nitro-benzol, and quinaldine.

EARLE E. RICHARDSON.